Dec. 7, 1954   J. B. PATRICKSON ET AL   2,696,573
ELECTRIC SIGNALING ARRANGEMENT FOR
PROTECTIVE OR OTHER PURPOSES
Filed April 1, 1952
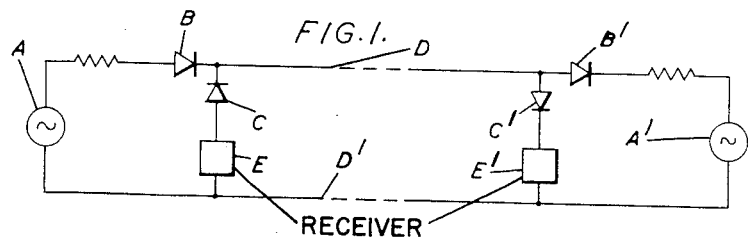
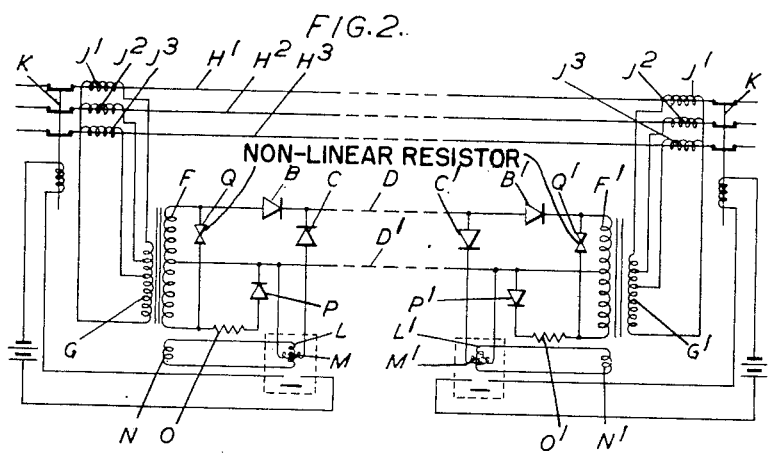
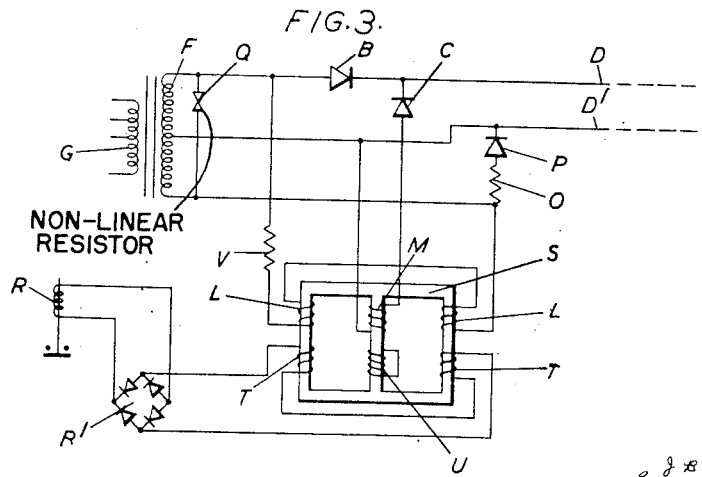
Inventors
J. B. Patrickson
H. L. Hamilton
By Watson Cole Grindle
and Watson
Attorneys United States Patent Office 2,696,573
Patented Dec. 7, 1954

2,696,573

ELECTRIC SIGNALING ARRANGEMENT FOR PROTECTIVE OR OTHER PURPOSES

John Brian Patrickson, Newcastle-on-Tyne, and Frederick Leslie Hamilton, Monkseaton, England, assignors to A. Reyrolle & Company Limited, Hebburn-on-Tyne, England, a British company Application April 1, 1952, Serial No. 279,756

Claims priority, application Great Britain April 9, 1951

12 Claims. (Cl. 317—28)

This invention relates to an electric signalling arrangement utilizing a single pair of pilot wires for two-way transmission of signalling currents, and, although applicable to various purposes, is more especially intended for use in an electric protective arrangement for the protection of a feeder or other electric circuit.

The primary object of the invention is to provide a simple and efficient signalling arrangement wherein it is possible to transmit signals simultaneously from opposite ends over a pair of pilot wires of the telephone or other type having low voltage insulation between the two wires and having a relatively high loop resistance together with a high distributed mutual electrostatic capacity. It will be appreciated that, while the invention is particularly suited to use with pilot wires having such characteristics, it is equally applicable to use with pilot wires of other types such as those normally used in electric protective arrangements.

The signalling arrangement according to the invention comprises a source of signalling current and a rectifier at each end in series with the two-wire pilot circuit, the two series rectifiers being arranged in such senses as to permit unidirectional current to circulate around the pilot circuit through the two sources, a shunt rectifier at each end in a shunt connection across the two pilot wires on the pilot wire side of the associated series rectifier, such shunt rectifier being opposed to the adjacent series rectifier in the local circuit including the source and the shunt connection, and a receiver at each end for receiving the signal from the source at the other end. Usually it will be convenient to connect such receiver in series with the shunt rectifier in the shunt connection across the two pilot wires.

When this arrangement is utilized for protective purposes, the signalling currents are derived from current transformers respectively energized in accordance with current flow conditions in the protected circuit at the two ends, so that the signals transmitted from one end to the other depend on such current flow conditions. Preferably, only a portion of the current transformer secondary winding is used at each end as the source of signalling current, another portion of such secondary winding having a load circuit including a rectifier to provide a load for the current transformer during the parts of the A. C. wave in which the series rectifiers oppose flow of current through the pilot circuit, and thereby to maintain an alternating flux in the current transformer and to prevent the magnetic saturation which might otherwise occur. It is convenient to connect a non-linear resistor across the current transformer secondary at each end in order to prevent undue rise of voltage across the pilot circuit.

The protective relay at each end may be in the form of a biassed relay, having an operating winding energized from the adjacent current transformer secondary winding and a biassing winding energized from the signal received from the other end. Alternatively, the protective relay at each end may consist of a sensitive relay energized through a transductor having an operating winding fed with current derived from the adjacent current transformer secondary winding and a biassing winding energized from the signal received from the other end. The term "transductor" is used herein, in the sense in which it is now commonly employed, to denote a device comprising a magnetic circuit bearing an operating winding energized from an A. C. source and a control or biassing winding energized from a D. C. source, these windings being so linked with the core that the effective A. C. impedance of the operating winding of the device is controlled by the degree of excitation of the biassing winding.

The invention may be carried into practice in various ways, but examples of the signalling arrangement according thereto and of the application of such signalling arrangement to the protection of a three-phase feeder are illustrated in the accompanying drawings, in which Figure 1 shows the signalling arrangement in its simplest form, Figure 2 illustrates one convenient practical protective arrangement, and Figure 3 shows a modification of the arrangement of Figure 2.

The simple signalling arrangement shown in Figure 1 consists of a local circuit at each end, including an A. C. source A (or $A^1$) of signalling current and two opposed rectifiers B, C (or $B^1$, $C^1$) connected in series with the source A (or $A^1$), and of a pair of pilot wires D, $D^1$ connecting the two local circuits. At each end the junction point between the two rectifiers B and C (or $B^1$ and $C^1$) is connected to one pilot wire D and one side of the source A (or $A^1$) is connected to the other pilot wire $D^1$. It is immaterial whether the same pilot wire connects the two junction points, or whether one pilot wire is connected to the junction point at one end and the other to the junction point at the other end. One rectifier C (or $C^1$) at each end is thus connected in a shunt connection across the ends of the two pilot wires D, $D^1$, while the other B (or $B^1$) is in series with the source A (or $A^1$). The two series rectifiers B, $B^1$ are connected in such senses as to permit a unidirectional current to circulate around the pilot circuit through the two sources A, $A^1$.

A receiver E (or $E^1$) is connected in series with the shunt rectifier C (or $C^1$) in the shunt connection at each end, and it will be at once clear that such receiver will not be able to respond to the signal generated by the adjacent source A (or $A^1$) owing to the opposition of the rectifiers B and C (or $B^1$ and $C^1$) in the local circuit, but will be able to respond to the signal received from the remote source. Alternatively, it may in some instances be convenient to employ a high resistance receiver in parallel with the shunt rectifier C.

The signalling currents from the two ends can thus flow simultaneously in the pilot circuit, and the relationship between the signal received at one end and the corresponding signal transmitted from the other end will depend on the relationship between the two transmitted signals.

Thus, if the two transmitted signals, one at each end, are in phase with one another and of the same amplitude, current will flow during one half-cycle from the source A at one end through the adjacent series rectifier B and one pilot wire D and back through the remote shunt rectifier $C^1$ and the other pilot wire $D^1$. This current cannot flow through the series rectifier $B^1$ at the remote end, since such rectifier is polarized by the greater opposing voltage from the remote source $A^1$ (greater because of the voltage drop along the pilot circuit), although preventing such opposing voltage from causing current flow. The remote receiver $E^1$ is therefore energized during one half-cycle directly from the source A at the home end. During the other half-cycle, the source A at the home end does not produce current flow, but the receiver E at the home end is energized directly from the remote source $A^1$. Thus, the signal received at either end will be proportional to and in phase with the signal transmitted from the opposite end.

If now the signals transmitted from the two ends are of equal amplitude but 180° out of phase with one another, current will flow during one half-cycle from both sources A, $A^1$ around the pilot circuit and through the two series rectifiers B, $B^1$, but no current will flow through either shunt rectifier C or $C^1$, since the resultant voltage across each shunt rectifier is in the reverse direction for conduction through such rectifier. During the other half-cycle, the series rectifiers B, $B^1$ will oppose current flow from either source. The two receivers E, $E^1$ in this case thus remain deenergized.

In the case when the two transmitted signals are of equal amplitude but differ in phase by some angle other than 180°, the conditions are intermediate between those of the two extreme cases above mentioned. Thus during one half-cycle, current will flow from the home source A through the remote receiver $E^1$ for part of the half-cycle but no current will flow through either receiver for the rest of the half-cycle, and similar conditions will apply during the other half-cycle during part of which the home receiver E is energized from the remote source $A^1$. The part of each half-cycle during which there is current flow decreases progressively as the phase-angle increases from zero to 180°.

Further variations in the conditions are obtained when the two transmitted signals are of different amplitudes, and in the extreme case when one only of the two sources, say A, is operating, the signalling current from such source will flow during alternate half-cycles through the pilot circuit and divide itself in the two parallel paths at the remote end respectively through the shunt rectifier $C^1$ and the receiver $E^1$ and through the series rectifier $B^1$ and the source $A^1$.

When this signalling arrangement is utilized as part of a protective arrangement for protecting a feeder or other main circuit, as shown in Figure 2, the source of signalling current at each end conveniently consists of a portion of the secondary winding F (or $F^1$) of a summation transformer whose primary winding G (or $G^1$) is energized through suitable tappings from current transformers $J^1$, $J^2$, $J^3$ on the individual phases $H^1$, $H^2$, $H^3$ of the protected circuit, the arrangement being such that an adequate secondary voltage will be obtained from the summation transformer F, G (or $F^1$, $G^1$) for every type of fault on the main protected circuit, such secondary voltage being accurately representative of the current flow conditions at the corresponding end of the protected circuit. The transformers F, G, $F^1$, $G^1$ at the two ends are identical with one another and are wound in such senses that (if the series rectifiers B, $B^1$ were removed) the secondary voltages of the two summation transformers would oppose one another in the pilot circuit D, $D^1$ when the current entering the protected circuit $H^1$, $H^2$, $H^3$ at one end is equal to and in phase with the current leaving the protected circuit at the other end.

The tripping of a circuit-breaker K (or $K^1$) at each end of the protected circuit $H^1$, $H^2$, $H^3$ in the event of a fault within that circuit is controlled by a protective relay of the biassed type having an operating winding L (or $L^1$) energized in accordance with the current flow conditions at the adjacent end of the protected circuit and a biassing winding M (or $M^1$) controlled by the current flow conditions at the remote end of the protected circuit. The operating winding L (or $L^1$) of such relay is directly energized from the secondary winding F (or $F^1$) of the adjacent summation transformer or (as shown) from a tertiary winding N (or $N^1$) on such transformer, and the signalling arrangement above described is utilized for energizing the biassing winding M (or $M^1$) of the relay, such biassing winding being connected in series with the shunt rectifier C (or $C^1$) and constituting the receiver of the signalling arrangement.

It will be appreciated from the description above given of the current flow in various circumstances in the pilot circuit D, $D^1$, that during certain parts of the A. C. cycle the secondary voltage of the summation transformer at either end does not give rise to the flow of current in the secondary circuit owing to the action of the rectifiers. It is however important to maintain an A. C. flux continuously in the core of such transformer in order to prevent the magnetic saturation which would otherwise occur, and, although it may be practicable in some instances, with a big enough transformer core, for the load of the operating winding L (or $L^1$) of the protective relay to have a swamping value relatively to the unidirectional load of the pilot circuit D, $D^1$, and thereby to provide a sufficient continuous secondary load for the summation transformer, it will usually be preferable to provide an alternative secondary circuit therefor which will provide the desired secondary load during those parts of the cycle when current from the summation transformer secondary F (or $F^1$) is not flowing in the pilot circuit.

To this end, only a portion of the summation transformer secondary winding F (or $F^1$) at each end is utilized as the source of signalling current, and another portion thereof is used to feed an alternative load circuit containing a resistance O (or $O^1$) and a rectifier P (or $P^1$), the sense of the rectifier P (or $P^1$) in such load circuit being opposite to that of the series rectifier B (or $B^1$) in the signalling circuit so that current will flow in the alternative load circuit during those parts of the cycle in which the series rectifier B (or $B^1$) opposes flow of current in the signalling circuit. The resistance O (or $O^1$) in the alternative load circuit is chosen to be equal in value to the loop resistance of the pilot circuit D, $D^1$, including the resistance of the bias winding $M^1$ (or M) of the relay at the remote end, so as to maintain approximately constant loading of the summation transformer throughout the complete cycle.

It is also desirable to provide means for ensuring that, for example in the event of a severe fault, the voltage between the two pilot wires D, $D^1$ will not rise above the value which the insulation between the pilot wires can withstand. One convenient way of effecting this is to provide a non-linear resistor Q (or $Q^1$) across the secondary winding F (or $F^1$) of the summation transformer at each end. Such resistor may be of the kind commercially known under the name "Metrosil." This resistor Q (or $Q^1$) will have the effect of distorting the wave-form of the transformer secondary voltage from the normal sinusoidal wave-form into an approximately square wave-form, but this will not adversely affect the protection, the main change being in the phase-angle characteristic. The voltage-limiting action of the non-linear resistor Q (or $Q^1$) takes place at a voltage dependent on the characteristics of the resistor, and it is found preferable so to choose these characteristics that the limiting action starts to occur at approximately twice normal full load, to ensure that the fault setting of the protective gear is not raised to a very high value by the normal load current through the protected circuit $H^1$, $H^2$, $H^3$. With this arrangement, the protective gear will operate by both phase comparison and amplitude comparison up to the limiting voltage of the non-linear resistor and on a phase comparison basis alone above such voltage, and efficient operation is obtained even with light internal fault currents flowing in conjunction with normal through-load currents.

The operation of this protective arrangement will to a large extent be clear from the description already given above of the operation of the basic signalling arrangement. There are three fault conditions to consider, namely a fault on the main circuit external to the protected section $H^1$, $H^2$, $H^3$ thereof, an internal fault within the protected section fed from both ends of the section, and an internal fault fed from one end only of the section.

In the case of an external fault, the secondary voltages of the summation transformers at the two ends are in phase with one another and of equal amplitude. Consequently, during one half-cycle signalling current flows from the secondary winding F at one end through the adjacent series rectifier B and one pilot wire D returning through the shunt rectifier $C^1$ and bias winding $M^1$ at the remote end and through the other pilot wire $D^1$, whilst during the other half-cycle a similar current flows from the remote secondary winding $F^1$ through the bias winding M at the home end. Thus the two bias windings M, $M^1$ are energized during alternate half-cycles, each in accordance with the secondary voltage at the opposite end. The operating windings L, $L^1$ of the relays are continuously energized in accordance with the secondary voltage at the adjacent end and the characteristic of each relay is such that it is restrained against operation in such circumstances, so that the circuit-breakers K, $K^1$ at the ends of the protected section remain closed in the event of a fault external to the section.

In the case of an internal fault fed from both ends, the secondary voltages of the summation transformers at the two ends are 180° out of phase with one another (assuming that the fault is sufficiently severe substantially completely to reverse the direction of current flow at one end of the protected section). In this case, during one half-cycle signalling current will circulate from both secondary windings F, $F^1$ around the pilot circuit through the two series rectifiers B, $B^1$ and no current will flow through either bias winding M or $M^1$, while during the other half-cycle no current will flow from either secondary winding F or $F^1$ through the pilot wires D, $D^1$ or through the bias windings M, $M^1$. Thus the two bias windings M, $M^1$ remain continuously deenergized, and the relays consequently operate to trip the circuit-breakers K, K¹ at both ends owing to the energization of their operating windings L, L¹.

In the case of an internal fault fed from one end only, the summation transformer at the feeding end has a secondary voltage which energizes the adjacent relay operating winding L, but the summation transformer at the remote end remains completely deenergized. Consequently, no signalling current flows through the bias winding M at the feeding end and the relay at the feeding end operates to cut out the protected section at that end. The bias winding M¹ at the other end is of course energized (in parallel with the series rectifier B¹ and secondary winding F¹ at that end) during alternate half-cycles from the secondary winding F at the feeding end, but this is of no consequence since the relay operating winding L¹ at such other end is itself deenergized. It is of course only necessary to cut out the protected section at the feeding end, when the section can be fed from one end only.

It remains to consider the case of an internal fault fed from both ends when the phase angle difference between the currents fed into the protected section at the two ends is other than 180°. In this case the conditions are intermediate between those for an external fault and those for an internal fault fed from both ends at 180° phase difference, and each bias winding M or M¹ is energized for a part only of each alternate half-cycle dependent upon the phase difference. Thus if the phase difference is $\theta°$, each bias winding remains deenergized for one half-cycle and for $\theta°$ of the other half-cycle and is energized during the remaining $(180-\theta)°$ thereof. Thus when $\theta=180$, the bias windings M, M¹ remain deenergized and when $\theta=0$ these windings receive their maximum energization, the energization of the bias windings progressively increasing from zero to the maximum as $\theta$ decreases from 180 to zero. In such cases, the operation of the protective relays depends in accordance with their settings on both phase difference and amplitude up to the limiting voltage value determined by the non-linear resistor Q or Q¹ and on phase difference only above such limiting voltage.

Each protective relay may be of any of the well-known forms employed for biassed relays, wherein the operation depends on the relative values of the operating force due to the operating winding L and the restraining force due to the bias winding M.

Alternatively, as shown in Figure 3, a sensitive relay R (for example a D. C. relay fed through full wave rectifiers R¹) may be employed in conjunction with a transductor, which may consist for instance of a three-limbed core S having the bias winding M on its centre limb and the operating winding L equally divided on its outer limbs, together with a secondary winding T also equally divided on the outer limbs for energizing the relay R and a short-circuited smoothing winding U on the centre limb. The transductor must be of the current-operated type, since the biassing signal serves to prevent operation of the relay R, and the necessary current source for the operating winding L may be obtained from the summation transformer secondary winding F with a high resistance V in series. It is sometimes of advantage to provide a rectifier in circuit with the smoothing winding U, in order to make the transductor output dependent on the phase relationship between the operating and biassing currents as well as on their amplitudes.

It will be appreciated that the foregoing arrangements have been described by way of example only and may be modified in various ways within the scope of the invention.

What we claim as our invention and desire to secure by Letters Patent is:

1. A two-way electric signalling arrangement, comprising a single pair of pilot wires, a source of signalling current at each end in series with the pilot circuit, a series rectifier at each end in series with the pilot circuit the two series rectifiers being arranged in such senses as to permit unidirectional current to circulate around the pilot circuit through the two sources, a shunt rectifier at each end in a shunt connection across the two pilot wires on the pilot wire side of the associated series rectifier such shunt rectifier being opposed to the adjacent series rectifier in the local circuit including the source and the shunt connection, and a receiver at each end for receiving the signal from the source at the other end, such receiver being connected in series with the shunt rectifier in the shunt connection across the two pilot wires.

2. An electric protective arrangement for an electric feeder or other circuit, comprising a current transforming device at each end of the protected circuit responsive to the current flow conditions in such circuit, a single pair of pilot wires connected at each end to the secondary winding of such current transforming device, a series rectifier at each end in series with the pilot circuit the two series rectifiers being arranged in such senses as to permit unidirectional current to circulate around the pilot circuit through the said secondary windings, a shunt rectifier at each end in a shunt connection across the two pilot wires on the pilot wire side of the associated series rectifier such shunt rectifier being opposed to the adjacent series rectifier in the local circuit including the secondary winding and the shunt connection, and relay means at each end of the protected circuit, said relay means including a winding in series with the shunt rectifier in the shunt connection, for receiving signals transmitted over the pilot circuit from the remote end and for cutting out the protected circuit at the adjacent end in accordance with the relationship between the secondary outputs of the current transforming devices at the two ends.

3. An electric protective arrangement as claimed in claim 2, in which a portion only of the secondary winding of the current transforming device at each end is utilized as the source of signalling currents transmitted over the pilot circuit, another portion of such secondary winding being connected to a load circuit including a rectifier to provide a load for the current transforming device during the parts of the A. C. wave in which the series rectifiers oppose flow of current through the pilot circuit.

4. An electric protective arrangement as claimed in claim 3, including a non-linear resistor connected across the secondary winding of the current transforming device at each end.

5. An electric protective arrangement as claimed in claim 2, including a non-linear resistor connected across the secondary winding of the current transforming device at each end.

6. An electric protective arrangement for an electric feeder or other circuit, comprising a current transforming device at each end of the protected circuit responsive to the current flow conditions in such circuit, a single pair of pilot wires connected at each end to the secondary winding of such current transforming device, a series rectifier at each end in series with the pilot circuit the two series rectifiers being arranged in such senses as to permit unidirectional current to circulate around the pilot circuit through the said secondary windings, a shunt rectifier at each end in a shunt connection across the two pilot wires on the pilot wire side of the associated series rectifier such shunt rectifier being opposed to the adjacent series rectifier in the local circuit including the secondary winding and the shunt connection, a biassed relay device at each end having an operating winding and a biassing winding, such biassing winding being connected in series with the shunt rectifier in the shunt connection for receiving signals transmitted over the pilot circuit from the secondary winding of the current transforming device at the remote end, means for energizing the operating winding of each relay device from the secondary output of the current transforming device at the adjacent end, and means whereby the relay device at each end controls the cutting out of the protected circuit at the adjacent end.

7. An electric protective arrangement as claimed in claim 6, including a load circuit connected across a portion of the secondary winding of the current transforming device at each end, such load circuit including a rectifier whereby the load circuit provides a load for the current transforming device during the parts of the A. C. wave in which the series rectifiers oppose flow of current through the pilot circuit.

8. An electric protective arrangement as claimed in claim 6, including a non-linear resistor connected across the secondary winding of the current transforming device at each end, and a load circuit connected across a portion of the secondary winding of the current transforming device at each end, such load circuit including a rectifier whereby the load circuit provides a load for the current transforming device during the parts of the A. C. wave in which the series rectifiers oppose flow of current through the pilot circuit.

9. An electric protective arrangement for an electric feeder or other circuit, comprising a current transforming device at each end of the protected circuit responsive to the current flow conditions in such circuit, a single pair of pilot wires connected at each end to the secondary winding of such current transforming device, a series rectifier at each end in series with the pilot circuit the two series rectifiers being arranged in such senses as to permit unidirectional current to circulate around the pilot circuit through the said secondary windings, a shunt rectifier at each end in a shunt connection across the two pilot wires on the pilot wire side of the associated series rectifier such shunt rectifier being opposed to the adjacent series rectifier in the local circuit including the secondary winding and the shunt connection, a transductor at each end having an operating winding and a biassing winding, means whereby the biassing winding at each end is energized in accordance with signals transmitted over the pilot circuit from the secondary winding of the current transforming device at the remote end, means whereby the operating winding at each end is energized from the secondary output of the current transforming device at the adjacent end, a sensitive relay at each end energized from the output of the transductor, and means whereby the relay at each end controls the cutting out of the protected circuit at the adjacent end.

10. An electric protective arrangement as claimed in claim 9, in which the biassing winding of the transductor at each end is connected in series with the shunt rectifier in the shunt connection.

11. An electric protective arrangement as claimed in claim 10, including a load circuit connected across a portion of the secondary winding of the current transforming device at each end, such load circuit including a rectifier whereby the load circuit provides a load for the current transforming device during the parts of the A. C. wave in which the series rectifiers oppose flow of current through the pilot circuit.

12. An electric protective arrangement as claimed in claim 9, including a non-linear resistor connected across the secondary winding of the current transforming device at each end, and a load circuit connected across a portion of the secondary winding of the current transforming device at each end, such load circuit including a rectifier whereby the load circuit provides a load for the current transforming device during the parts of the A. C. wave in which the series rectifiers oppose flow of current through the pilot circuit.

References Cited in the file of this patent

UNITED STATES PATENTS

| Number | Name | Date |
|---|---|---|
| 1,468,441 | Fitzgerald | Sept. 18, 1923 |
| 2,416,669 | Sciaky | Mar. 4, 1947 |

FOREIGN PATENTS

| Number | Country | Date |
|---|---|---|
| 641,244 | Great Britain | Aug. 9, 1950 |